No. 866,776. PATENTED SEPT. 24, 1907.
A. P. CRELL.
REVERSING MECHANISM.
APPLICATION FILED JUNE 5, 1907.

2 SHEETS—SHEET 1.

Witnesses
J. A. Clark
E. J. Nobb

Inventor
Albert P. Crell
By
Ithiel J. Cilley
Attorney

No. 866,776. PATENTED SEPT. 24, 1907.
A. P. CRELL.
REVERSING MECHANISM.
APPLICATION FILED JUNE 5, 1907.

2 SHEETS—SHEET 2.

Witnesses
J. C. Clark
E. J. Noble

Inventor
Albert P. Crell
By Ithiel J. Cilley
Attorney

UNITED STATES PATENT OFFICE.

ALBERT P. CRELL, OF IONIA, MICHIGAN.

REVERSING MECHANISM.

No. 866,776.	Specification of Letters Patent.	Patented Sept. 24, 1907.

Application filed June 5, 1907. Serial No. 377,459.

*To all whom it may concern:*

Be it known that I, ALBERT P. CRELL, a citizen of the United States, residing at Ionia, in the county of Ionia and State of Michigan, have invented certain new and useful Improvements in Reversing Mechanism, of which the following is a specification.

Figure 1:
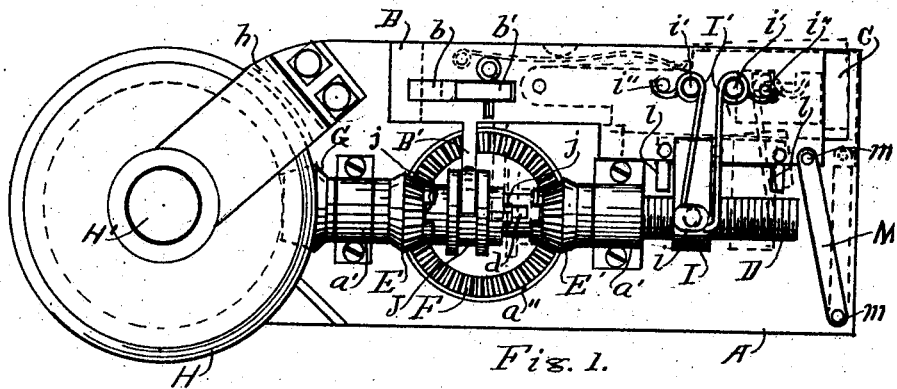
Figure 2:
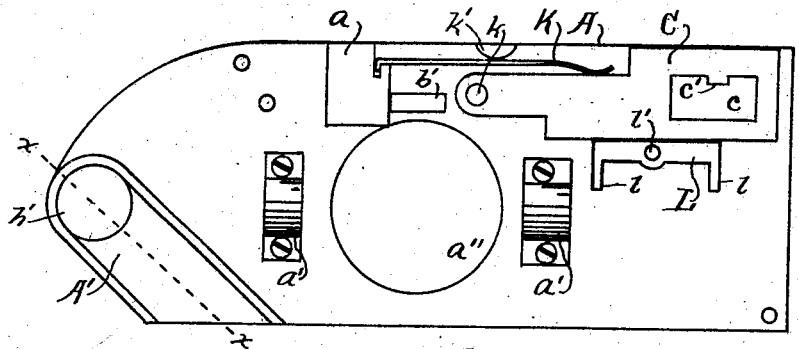
Figure 3:
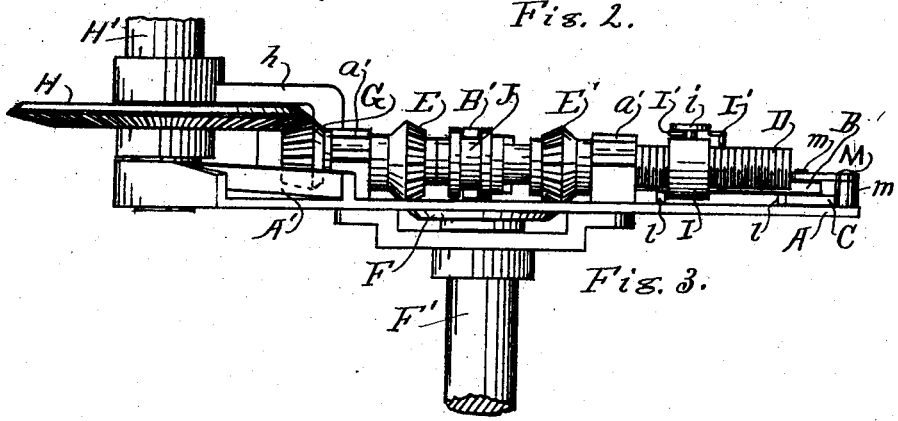
Figure 4:
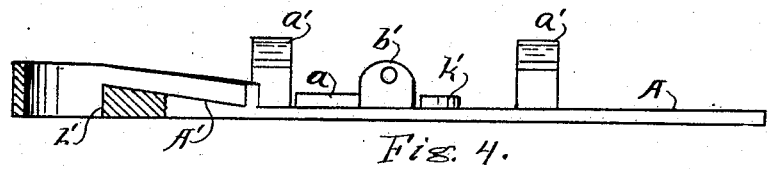
Figure 5:
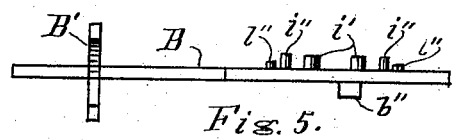
Figure 9:
Figure 6:
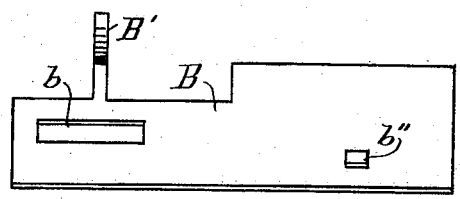
Figure 7:
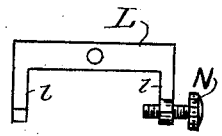
Figure 8:

My invention relates to improvements in reversing mechanism for use upon machines that must be readily reversed to run alternately, first in one direction and then in the opposite direction, and particularly for use upon washing machines, churns, and kindred machines, and its objects are: First, to provide a reversing mechanism that will be positive in its action and automatic in its working. Second, to provide a reversing mechanism that will be positively locked to place when in actual work, and which will readily trip and reverse itself at the desired time, and, third, to provide a reversing mechanism that may be set to reverse itself at longer or shorter intervals, as desired. I attain these objects by the mechanism illustrated in the accompanying drawing in which Figure 1 is a top plan of the mechanism. Fig. 2 is the same with the upper plate removed to show the locking and tripping mechanism more plainly. Fig. 3 is a side elevation of the same. Fig. 4 is a side elevation of the base with the reversing mechanism removed, and shown in section on the line $x\ x$ of Fig. 2. Fig. 5 is an edge view of the upper plate. Fig. 6 is a bottom plan of the same, partly in perspective. Fig. 7 is a plan of the trip showing an adjusting screw, Fig. 8 is an end view of the same, and Fig. 9 is a bottom plan of the actuating nut, showing inclines thereon.

Similar letters refer to similar parts throughout the several views.

In the drawing A represents the base or supporting plate that supports the entire working mechanism of the machine. This plate is provided with boxes $a'$ for the support of the shaft D; with an upwardly projecting bed $a$ for the support of the upper plate B and an incline A' and bearing $h'$ for seating and supporting the lower end of the shaft H' that carries the gear wheel H. The upper end of the shaft H' is supported by the bearing $h$, to revolve freely between the bearings $h$ and $h'$.

For the reversing mechanism I mount the shaft D in the boxes $a'\ a'$ and provide a gear wheel G at one end in position to engage, or be engaged by the gear wheel H to cause the shaft H' to revolve, as the shaft D revolves. Between, and adjacent to the boxes $a'\ a'$ I mount two bevel gear wheels, E and E', in such a manner that they will, in their normal condition, revolve freely upon the shaft D and provide each of these gear wheels with a clutching device $j$ arranged to be made to engage, alternately, the corresponding clutching devices at each end of the reversing clutch J, which is mounted upon the shaft D to slide longitudinal thereof between the gear wheels E and E', but is prevented from revolving thereon, or of allowing the shaft to revolve independent of this clutch, by the key or spline $d$, see Fig. 1. The gear wheels E and E' are made to revolve by the gear wheel F, which is mounted on the shaft F' and as the gear wheels E and E' are mounted diametrically opposite each other, relative to the gear F, they, as a matter of course, are made to revolve in opposite directions so that if the clutch J is thrown over to engage the gear wheel E the shaft D will be made to revolve, say, to the right, and if it is made to engage the gear wheel E' the shaft D will be made to revolve the opposite direction, say, to the left, and as the back, or right hand end of the shaft D is provided with a screw thread, as shown in Figs. 1 and 3, and has a nut I mounted thereon to be actuated by said screw thread to travel lengthwise of the bolt, first one way and then the other as the motion of the shaft is reversed, and the clutch J is actuated to engage first the gear wheel E and then the gear wheel E', alternately, as follows: A latch C is pivoted, at one end, to the base A, as at $k$, so that the other end may be made to swing back from, or toward the trip L which is pivoted to the base A at $l'$ so that it may be actuated to throw the latch C back against the tension of the spring K, or its equivalent. This trip is actuated by the nut I coming in contact with the arms $l\ l$ on the trip, and I find that this trip is much more effectually operated by means of an incline, as I'', on the under surface of the nut I as, with this arrangement, the action of the nut upon the trip is of a sliding angular incline rather than a direct longitudinal push, as is the case when the nut simply presses directly against the sides of the arms $l\ l$.

Above the latch C I place an upper plate B, which is held to place upon the bed A and the latch C by means of the post $b'$ and an ordinary key, as shown in Fig. 1, at one end, and a swinging rod M, pivoted to the bed and to the upper plate, as at $m\ m$, so that it may swing with the upper plate as it moves lengthwise. This plate may be provided with a slot $b$, that works over the post $b'$, and has an arm B' that projects out and engages the clutch J so that when the plate B slides in either direction it will carry the clutch with it, thus alternating the position of the clutch to make it engage first the gear wheel E and then the gear wheel E', continuously, as long as the machine is in operation, and to actuate the plate B I find it well to secure two springs, as I', to the plate upon posts, as $i'\ i'$, with resistance posts, as $i''\ i''$, to hold the springs against the action of the nut I as it is carried back and forth on the shaft D, as hereinbefore described, the long ends of the springs I' being made to engage the lug $i$ on the nut I so that as the nut is moving in either direction the spring on the side toward which the nut is traveling will be engaged and carried with the nut until considerable tension is produced and the nut approaches one of the arms $l$ on the trip L and throws the trip around until the lug $b''$ on the plate is released from the lug $c'$, in the slot $c$ in the latch C, when the tension of the spring will force the plate B endwise and disengage the clutch J from one of the gear wheels, say E, and carry it into engagement with the gear wheel E', etc., thus reversing the motion of the shaft and, with it, the motion of the actuating nut I and, alternately, reversing the motion of the gear wheel H and the shaft H' for continuation to any machinery that may be connected therewith.

To lengthen or shorten the travel of the nut I, and thereby lengthen or shorten the length of time the shaft H revolves in each direction, I find that the most convenient means is the use of a set screw, as N, in one of the arms $l$ of the trip L, though there are several mechanical means for producing the same result.

In the construction shown in the accompanying drawings I have indicated the use of a flat spring K acting directly upon the back edge of the latch C, but I do not desire to restrict myself to this special spring as any available form of spring may be used without departing from the spirit of my invention.

The shaft F' is provided with a proper support to hold it in position to allow the gear wheel F to pass through the opening $a''$ in position to properly engage the gear wheels E and E'.

It sometimes happens that the upper plate B will be held by the clutch, so solidly that the springs I' cannot actuate it, and to obviate this difficulty I place pins $l''$ in the plate in position so that after the nut I has thrown the trip L and the plate B does not move, the further movement of the nut in the same direction will bring it in contact with one of these pins and draw the plate far enough so that the springs will easily carry it to the desired position to reverse the motion of the mechanism.

Having thus fully described my invention, what I claim as new, and desire to secure by Letters Patent of the United States, is:

1. In a reversing mechanism, a base plate having boxes thereon, a driving shaft and gear revolubly secured thereto, a shaft mounted to revolve in the boxes at right angles with the driving shaft, two gear wheels revolubly mounted on the second shaft between the boxes and engaging the driving gear at diametrically opposite points, a clutch mounted on said shaft between the gear wheels and arranged to engage each alternately, a spline in the shaft to revolve the clutch with the shaft, said shaft having a screw thread at one end, a nut actuated by said screw thread, a sliding plate, a latch, a trip, and springs arranged to actuate the clutch longitudinally of the shaft.

2. The combination in a reversing mechanism, of a base plate having boxes thereon, a driving shaft and gear wheel at right angles with the plate, a shaft supported in the boxes parallel with the plate, and having a screw thread on one end, two gear wheels revolubly mounted on the shaft between the boxes and engaging the driving gear wheel at diametrically opposite points, a nut mounted on the screw threaded end of the shaft, a trip pivotally mounted on the base plate in the line of travel of the nut, a latch pivotally connected with the base plate at one end and having a lug thereon a spring for actuating said latch against the trip, an upper plate slidably mounted over the latch and having a lug engaging the lug on the latch, springs connecting the plate with, and actuated by the nut, an arm extending from the plate and engaging the clutch for actuating the clutch lengthwise of the shaft, and a spline on the shaft for revolving the clutch with the shaft.

3. The combination in reversing mechanism, of a base plate, boxes on the base plate, a driving shaft mounted at right angles with the base plate, a driving gear mounted on said shaft, a shaft mounted in the boxes parallel with the base plate, and having a screw thread on one end, a nut engaging said screw thread and actuated thereby, a gear wheel on the other end of the shaft, a shaft mounted in the base plate at right angles therewith, a gear wheel mounted on said shaft and engaging the gear wheel on the parallel shaft, gear wheels mounted on the parallel shaft between the boxes and revoluble thereon, said gear wheels engaging the driving gear at diametrically opposite points, a clutch slidingly mounted on said shaft between the gear wheels, a spline in the shaft engaging said clutch, a longitudinally sliding plate having an arm thereon engaging the clutch, springs thereon engaging the nut, a latch connected with the sliding plate, a spring and a trip for actuating the latch, and an appliance for adjusting the travel of the nut.

Signed at Ionia Michigan May 31 1907.

ALBERT P. CRELL.

In presence of—
A. C. COLVIN,
L. H. RECTOR.